United States Patent [19]
Komoda et al.

[11] Patent Number: 5,430,796
[45] Date of Patent: Jul. 4, 1995

[54] AUXILIARY ATTENUATOR ARRANGEMENT FOR USE IN VOICE-SWITCHED SPEAKERPHONE AND METHOD OF SELECTIVELY INSERTING COMMUNICATION LOSS IN SPEAKERPHONE PATHS

[75] Inventors: Motoyoshi Komoda, Tokyo; Ikio Yoshida, Saitama, both of Japan

[73] Assignee: NEC Corporation, Tokyo, Japan

[21] Appl. No.: 793,120

[22] Filed: Nov. 18, 1991

[30] Foreign Application Priority Data

Nov. 19, 1990 [JP] Japan .................. 2-313050

[51] Int. Cl.⁶ .......................................... H04M 11/00
[52] U.S. Cl. ........................... 379/389; 379/388; 379/390; 379/391; 379/392
[58] Field of Search .............. 379/389, 387, 388, 390, 379/391, 392, 406, 407, 409, 410, 345, 347, 58

[56] References Cited

U.S. PATENT DOCUMENTS

| | | | |
|---|---|---|---|
| 4,507,524 | 3/1985 | Yun | 379/389 |
| 4,764,954 | 8/1988 | Tsurusaki et al. | |
| 4,982,425 | 1/1991 | Yoshida | 379/58 X |
| 5,014,294 | 5/1991 | Kromenaker et al. | 379/58 |
| 5,212,722 | 5/1993 | Murata | 379/409 X |

*Primary Examiner*—James L. Dwyer
*Assistant Examiner*—M. Shehata
*Attorney, Agent, or Firm*—Sughrue, Mion, Zinn, Macpeak & Seas

[57] ABSTRACT

Speech signals appearing at the receiving and transmitting paths of a speakerphone which operates under voice switching, are received at a control circuit. The control circuit issues a control signal which assumes a first level in the event that a signal at the receiving path exceeds a signal at the transmitting path and which assumes a second level if the signal at the receiving path falls below the signal at the transmitting path. Communication loss is inserted in both the receiving and transmitting paths in response to the first level of the control signal, and is eliminated therefrom in response to the second level of the control signal.

5 Claims, 4 Drawing Sheets

AUXILIARY ATTENUATOR ARRANGEMENT FOR USE IN VOICE-SWITCHED SPEAKERPHONE AND METHOD OF SELECTIVELY INSERTING COMMUNICATION LOSS IN SPEAKERPHONE PATHS

BACKGROUND OF THE INVENTION

1. Field of the Invention

The present invention relates generally to a voice-switched speakerphone coupled to a public switched telephone network, and more specifically to such a speakerphone having an auxiliary attenuator arrangement.

2. Description of the Prior Art

A speakerphone offers the advantage of hands-free telephoning by replacing the familiar handset with a separate microphone and loudspeaker. The convenience of such an arrangement justifies extensive efforts to overcome its acoustic and transmission limitations. In order to overcome the disadvantages inherent in the speakerphone, voice switching has been proposed.

Before turning to the present invention it is deemed advantageous to describe in brief a conventional voice-switched speakerphone used in a mobile telephone network with reference to FIGS. 1 and 2. FIG. 2 will again be referred to later when discussing the instant invention.

In FIG. 1, a voice switching circuit 8 is coupled to a loudspeaker 10 and a microphone 12. The loudspeaker 10 is coupled to a receiving path 14 with a variable gain amplifier 16 forming part of the circuit 8, while the microphone 12 is coupled to a transmitting path 18 with another variable gain amplifier 20 also forming part of the circuit 8. The amplifiers 16, 20 are respectively connected to a receiver 22 and a transmitter 24 both of which are coupled via a duplexer 26 to an antenna 28 and then to a public switched telephone network (not shown).

The voice switching circuit 8 further includes a hysteresis comparator 26 and two signal level detectors 28, 30 each of which has a controllable gain. Each gain of the detectors 28, 30 is previously set to a suitable value considering an overall system in which the speakerphone is installed.

The signal level detectors 28, 30 are arranged to receive the loudspeaker and microphone voltages, respectively, and applies the outputs thereof to the hysteresis comparator 26.

Generally, the voice switching allows substantially one direction of transmission to be fully active at a time. It is assumed that the hysteresis comparator 26 is initially supplied with the outputs (Vdr, Vdt) of the detectors 28, 30. If the output Vdr is larger than Vdt, the comparator 26 issues a high level control signal which sets the amplifier 16 to a full gain and the amplifier 20 to the minimum gain, which is referred to as a receive mode. With the receive condition, even if the output Vdr falls and crosses Vdt, the receive mode is maintained due to the hysteresis characteristics of the comparator 26. That is, the comparator 26 continues to issue the high level control signal. Thereafter, if the output Vdr eventually falls below a critical level of the hysteresis curve, the output of the comparator 26 is switched over to a low level control signal by which the amplifier 16 is set to the minimum gain thereof and the amplifier 20 to a full gain. Thus, the speakerphone, which includes the loudspeaker 10, the microphone 12 and the circuit 8 in the instant case, is brought into a transmit mode. The above-mentioned operation which depends on the previous history induced by the comparator 26 is also applied to the other case where the speakerphone 8 is transferred from the transmit mode to the receive mode.

FIG. 2 is a known switching diagram for analyzing the performance of a speakerphone. This graphical method is helpful and offers the advantage over an algebraic analysis of showing at a glance the condition of the speakerphone.

In FIG. 2, the abscissa represents the voltage at the terminal of the loudspeaker 10 and the ordinate the voltage across the microphone 12. The plane is divided into three regions: transmit, hysteresis and receive regions (T, H and R) by two transition lines A, B. Solid line C is plotted to indicate a line on which the microphone and loudspeaker voltages are identical with each other. The mode which the speakerphone assumes in the hysteresis region H, is determined depending on the previous history. That is, if the receive mode is the previous one then the speakerphone 8 remains same in the hysteresis region H, and vice versa.

Returning to FIG. 1, a broken line 40 indicates an acoustic coupling. Incoming speech signal received at the loudspeaker 10 is fed back through the acoustic coupling 40 to the microphone 12. On the other hand, a broken line 42 reflects network echoes which include feedbacks from hybrid circuits provided in exchanges (for example), a distant talker echo, etc.

The gains of the detectors 28, 30 should be appropriately adjusted for the naturalness of the conversation in the voice-switched communication. The transition lines A, B shown in FIG. 2, are plotted according to the voice-switched operations defined by the gains of the detectors 28, 30. A point P1 indicates a network echo level detected as a voltage Vr1 at the terminal of the loudspeaker 10 when a microphone voltage Vt1 is inputted, while a point P2 represents an amount of acoustic coupling detected as a voltage Vt2 at the terminal of the microphone 12 when a loudspeaker voltage Vr2 is applied to the loudspeaker terminal. In order to assure the correct voice switching operations of the circuit 8, the transition lines A and B have to be determined in a manner that the point P1 is located in the transmit region T and the point P2 in the receive region R.

It is usual to set the gains of the detectors 28, 30 assuming that a distant talker uses a handset and holds the microphone thereof close to his or her mouth and places the speaker against his or her ear. Further, it is a current tendency to narrow the width of the hysteresis region H (the amount of loss during switching) to improve the naturalness of the conversation. On the other hand, in the case where a distant talker also uses a speakerphone, the loudspeaker voltage Vr1 due to the network echo increases up to a loudspeaker voltage Vr3. In other words, the point P1 moves to a point P3 which is located in the receive region R. Thus, the voice switching circuit 8 fails to implement the correct operations thereof and thus invites blocking. Furthermore, "singing" or "howling" also occurs due to the narrow width of the hysteresis region H.

SUMMARY OF THE INVENTION

It is an object of the present invention to provide an arrangement for eliminating or effectively reducing undesirable phenomena such as blocking and singing referred to above.

Another object of the present invention is to provide a method of eliminating or effectively reducing undesirable phenomena such as blocking and singing referred to above.

In brief, the above objects are achieved by a method and arrangement wherein speech signals appearing at the receiving and transmitting paths of a speakerphone which operates under voice switching, are received at a control circuit. The control circuit issues a control signal which assumes a first level in the event that a signal at the receiving path exceeds a signal at the transmitting path and which assumes a second level if the signal at the receiving path falls below the signal at the transmitting path. Communication loss is inserted in both the receiving and transmitting paths in response to the first level of the control signal, and is eliminated therefrom in response to the second level of the control signal.

More specifically a first aspect of the present invention is deemed to come in an arrangement for use in a speakerphone which operates under voice switching, comprising: first means provided in a receiving path of the speakerphone, the first means selectively inserting communication loss in the receiving path and removing same therefrom in response to a control signal applied thereto; second means provided in a transmitting path of the speakerphone, the second means selectively inserting communication loss in the transmitting path and removing same therefrom in response to a control signal applied thereto; and a control means coupled to receive signals appearing at the receiving and transmitting paths, the control means issuing the control signal which allows the first and second means to respectively insert the communication losses in the receiving and transmitting paths in the event a signal at the receiving path exceeds a signal at the transmitting path, and the control means issuing the control signal which allows the first and second means to remove the communication losses in the receiving and transmitting paths if the signal at the receiving path falls below the signal at the transmitting path.

A second aspect of the present invention is deemed to come in a method of inserting or removing loss in both a receiving path and a transmitting path of a speakerphone which operates under voice switching, the method comprising the steps of: (a) receiving signals appearing at the receiving and transmitting paths at a control means, the control means issuing a control signal which assumes a first level in the event that the signal at the receiving path exceeds a signal at the transmitting path and which assumes a second level if the signal at the receiving path falls below the signal at the transmitting path; and (b) applying communication loss in both the receiving and transmitting paths in response to the first level of the control signal, and eliminating the communication loss from both the receiving and transmitting paths in response to the second level of the control signal.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE RPEFERRED EMBODIMENTS

Figure 3:
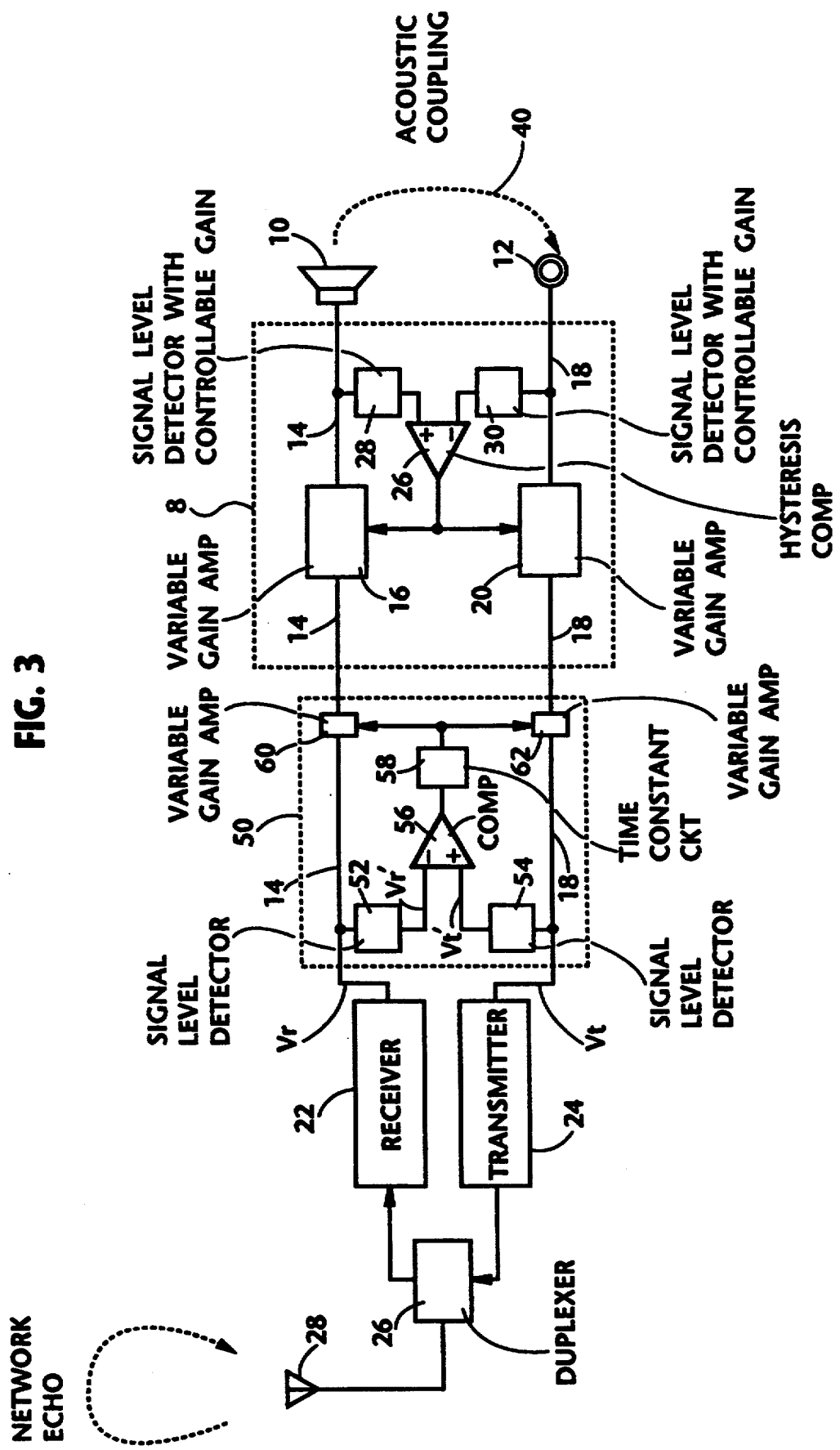
FIG. 3 is a block diagram showing an embodiment of the present invention together with an arrangement associated therewith.

Reference is now made to FIG. 3 wherein an embodiment of the present invention is schematically illustrated.

Figure 1:
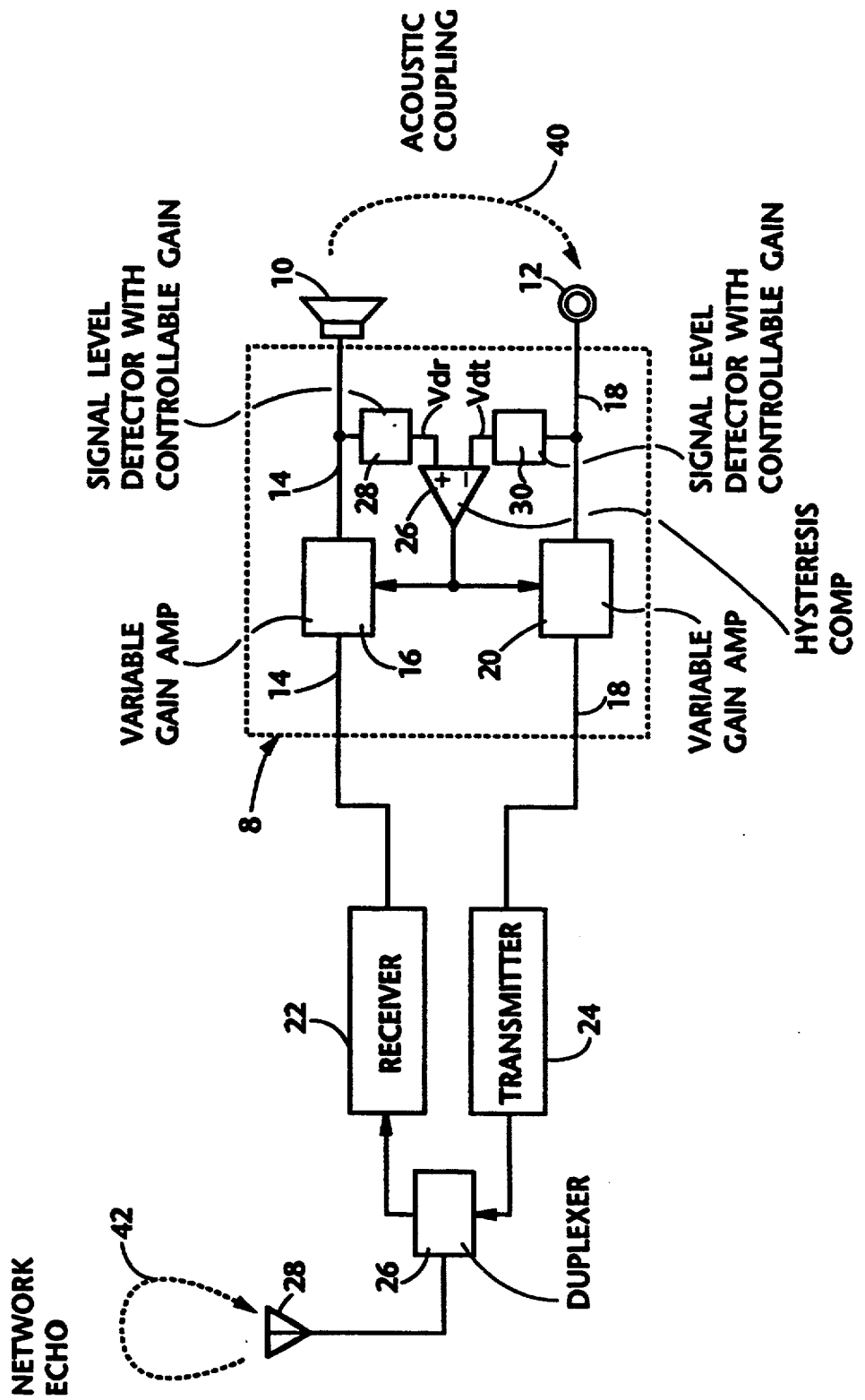
FIG. 1 is a block diagram showing an arrangement of a known speakerphone and an arrangement associated therewith, which have been discussed in the opening paragraphs of the instant specification.

The arrangement of FIG. 3 differs from that of FIG. 1 in that the former arrangement further includes an auxiliary attenuator arrangement 50. The remaining portions of FIG. 3 are identical with those of FIG. 1 and accordingly, further description thereof will be omitted for the sake of brevity.

Figure 2:
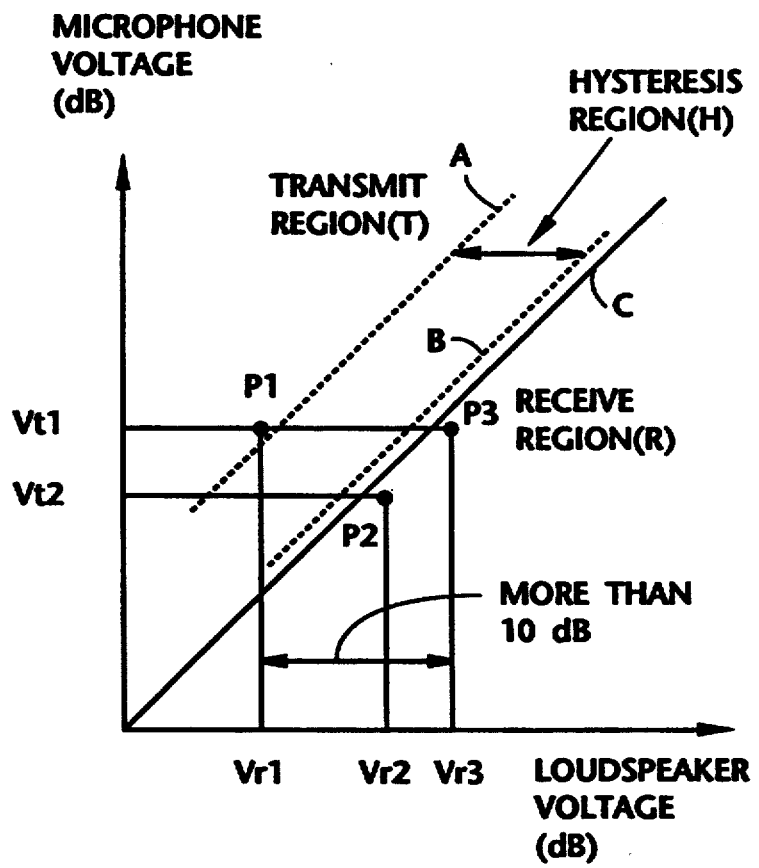
FIG. 2 is a plot showing the voice switching operations of the speakerphone shown in FIG. 1.

The arrangement 50 includes, two signal level detectors 52, 54, a comparator 56, a time constant circuit 58 and two variable gain amplifiers 60, 62, all of which are coupled as shown. Each gain of the detectors 52, 54 is adjustable such that the output of the comparator 56 is reversed when the point P1 (for example) crosses the transition line B shown in FIG. 2 due to increase of network echoes. The speech signals input to the detectors 52, 54 are respectively denoted be Vr and Vt. The comparator 56 issues a high voltage if the output of the detector 52 (denoted by Vr') is below the output of the detector 54 (denoted by Vt'), and issues a low voltage if Vr' is equal to or greater than Vt'. The output of the comparator 56 is given a predetermined time delay by the time constant circuit 58 and then applied to the variable gain amplifiers 60, 62. The time constant circuit 58 is provided to reduce undesirable changes of signal levels caused by insertion or removal of loss at the amplifiers 60, 62.

The variable gain amplifiers 60, 62 provide the paths 14, 18 with no loss in response to the high level voltage applied thereto from the time constant circuit 58. On the contrary, each of variable gain amplifiers 60, 62 inserts a predetermined loss in the paths 14, 18 in response to the low voltage applied thereto from the time constant circuit 58. In the event that the gains of the signal level detectors 52, 54 are set such that the comparator 56 changes the output level when the point P1 crosses the transition line B, the above-mentioned problems inherent in the prior art are effectively removed.

It is of importance to note that: (a) if the network echoes reach a predetermined level, the arrangement 50 inserts loss in both the receiving and transmitting paths 14, 18, (b) when the network echoes do not reach the predetermined level, no loss is inserted by the arrangement 50, and (c) the insertion or removal of loss by the arrangement 50 is delayed in order to improve naturalness of conversation.

Figure 4:
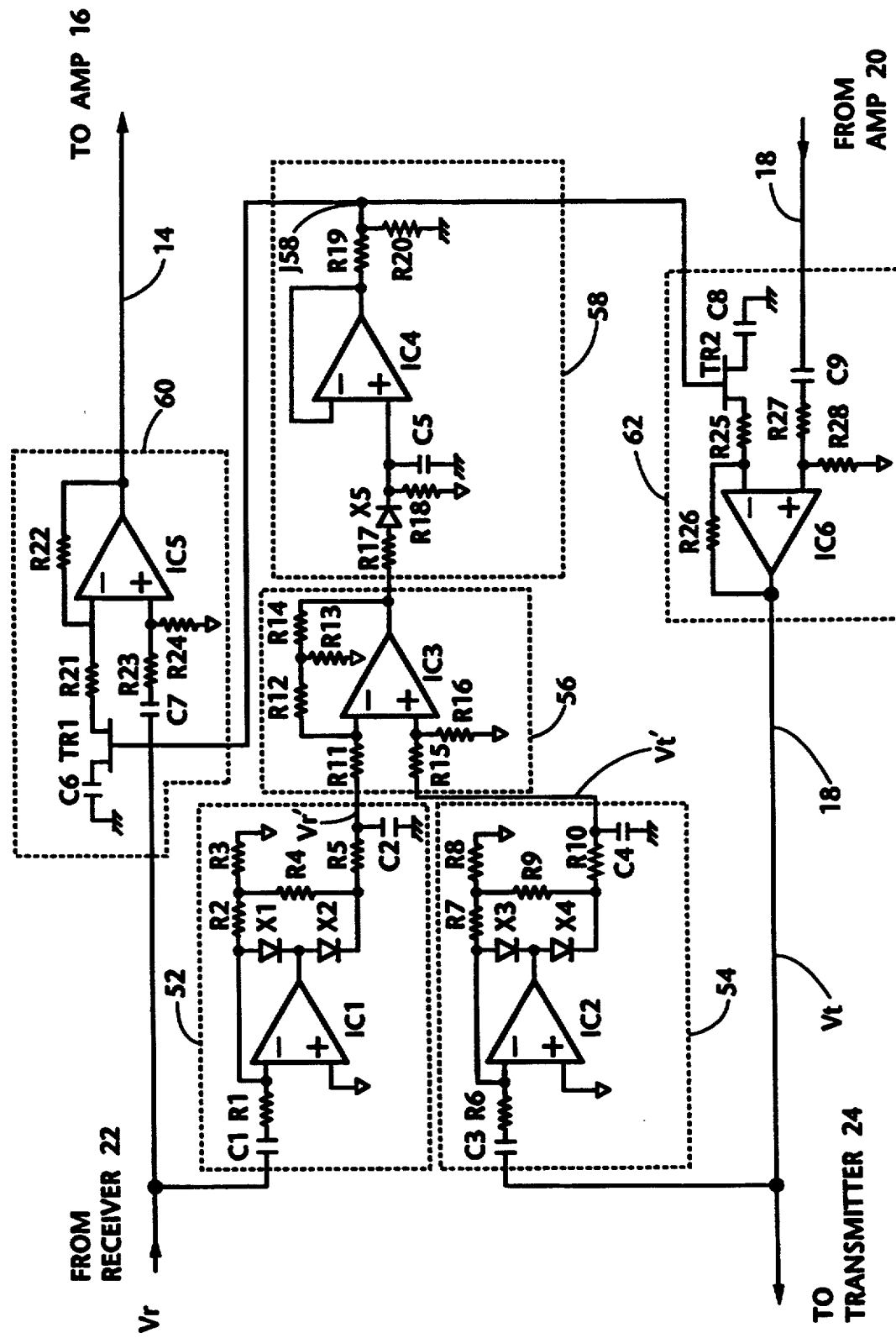
FIG. 4 is a circuit diagram showing in detail the content of the blocks shown in FIG. 3.

FIG. 4 is a circuit diagram showing the detail of the auxiliary attenuator arrangement 50. The contents of the individual blocks 52–62 per se are well known to those skilled in the art and hence only simple descriptions thereof will be given.

The output of the receiver 22 shown in FIG. 3 (Vr) is applied to the blocks 52, 60. The signal level detector 52 includes a coupling capacitor C1 and a rectifier with controllable gain. The rectifier consists of an operational amplifier (OP) IC1, four resistors R1-R4, and two diodes X1-X2. The non-inverting terminal (+) of the OP IC1 is supplied with a predetermined positive voltage through a terminal indicated by a triangular shaped notation. The gain of the above-mentioned rectifier is determined by R4/R3. The rectified signal is then smoothed by a circuit consisting of a resistor R5 and a capacitor C2.

On the other hand, the other signal level detector 54 is configured in a manner similar to the detector 52, and includes a coupling capacitor C3 and a rectifier which includes an OP IC2, four resistors R6-R9, and two diodes X3-X4. This rectifier has a gain determined by R9/R8. A resistor R10 and a capacitor C4 constitutes a smoothing circuit.

The outputs of the detectors 52, 54 are applied to the comparator 56 which includes resistors R11-R16 and an OP IC3. As metioned above, the comparator 56 issues a high voltage if Vt'>Vr' and issues a low voltage if Vt'≦Vr'.

The time constant circuit 58 includes an arrangement by which a time lag is given to the output from the comparator 56. The time lag arrangement includes two resistors R17-R18, a diode X5 and a capacitor C5. The circuit 58 further includes an OP IC4 functioning as a buffer and two resistors R19-R20. Thus, the output of the comparator 56 appears at a junction J58 between R19 and R20 after a predetermined time delay.

The variable gain amplifier 60 includes a non-inverting amplifying portion consisting of an OP IC5 and four resistors R21-R24, and further includes two capacitors C6-C7 and a field effect transistor (FET) TR1. Similarly, the variable gain amplifier 62 includes a non-inverting amplifying position which consists of an OP IC6 and four resistors R25-R28, and further includes two capacitors C8-C9 and a field effect transistor (FET) TR2. C7, C9 are coupling capacitors and C6, C8 are provided for grounding alternating current components.

When the output of the circuit 58 appearing at the junction J58 assumes a high voltage, the FETs TR1 and Tr2 are rendered ON wherein the amplifiers 60, 62 exhibits no insertion loss (viz., gain is unity). Contrarily, when the output of the circuit 58 at the junction J58 is a low voltage, the FETs TR1 and TR2 are switched over to OFF state wherein the amplifiers 60, 62 respectively insert a predetermined loss in the paths 14, 18 (viz., gain is below unity). As mentioned above, the output of the comparator 56 appears at the junction J58 after a predetermined delay time, unnatural feeling imparted to a talker due to insertion or removal of attenuation can be extensively reduced.

The embodiment of the present invention has been discussed with a voice-switched speakerphone used in a mobile telephone network. However, the present invention is not limited thereto and is applicable to 2-wire telephone network wherein a hybrid circuit replaces the blocks 22, 24 and 26 in FIG. 3.

While the foregoing description describes a single embodiment according to the present invention, the various alternatives and modifications possible without departing from the scope of the present invention, which is limited only by the appended claims, will be apparent to those skilled in the art.

What is claimed is:

1. An apparatus for use in a speakerphone which operates under voice switching, comprising:
   first means provided in a receiving path of the speakerphone, the first means selectively inserting communication loss in the receiving path and removing same therefrom in response to a control signal applied thereto;
   second means provided in a transmitting path of the speakerphone, the second means selectively inserting communication loss in the transmitting path and removing same therefrom in response to the control signal applied thereto; and
   control means coupled to receive signals appearing at the receiving and transmitting paths, the control means issuing the control signal which allows the first and second means to respectively insert the communication losses in the receiving and transmitting paths in the event a signal at the receiving path exceeds a signal at the transmitting path, and the control means issuing the control signal which allows the first and second means to remove the communication losses in the receiving and transmitting paths if the signal at the receiving path falls below the signal at the transmitting path.

2. An apparatus as claimed in claim 1, wherein each of the first and second means is an amplifier which assumes one of two gains in response to the control signal.

3. An apparatus as claimed in claim 1, wherein the control means includes:
   a first detector for detecting a signal level appearing at the receiving path, the gain of the first detector being controllable;
   a second detector for detecting a signal level appearing at the transmitting path, the gain of the second detector being controllable; and
   a comparator being coupled to receive the outputs of the first and second detectors, the comparator issuing the control signal which assumes a first level if the output of the first detector reaches the output of the second detector and issuing the control signal which assumes a second level if the output of the first detector is below the output of the second detector.

4. An apparatus as claimed in claim 3, further comprising:
   a time delay means with an input coupled to the comparator and with an output coupled to the first and second means.

5. A method of inserting or removing loss in both a receiving path and a transmitting path of a speakerphone which operates under voice switching, the method comprising the steps of:
   (a) receiving signals appearing at the receiving and transmitting paths at a control means, the control means issuing a control signal which assumes a first level in the event that the signal at the receiving path exceeds the signal at the transmitting path and which assumes a second level if the signal at the receiving path falls below the signal at the transmitting path; and
   (b) applying communication loss in both the receiving and transmitting paths in response to the first level of the control signal, and eliminating the communication loss from both the receiving and transmitting paths in response to the second level of the control signal.

* * * * *

UNITED STATES PATENT AND TRADEMARK OFFICE
CERTIFICATE OF CORRECTION

PATENT NO. : 5,430,796
DATED : July 4, 1995
INVENTOR(S) : Motoyoshi Komoda, Ikio Yoshido It is certified that error appears in the above-indentified patent and that said Letters Patent is hereby corrected as shown below:

Column 4, line 30, delete "be" and insert --by --.

Column 5, line 44, delete "Tr2" and insert --TR2 --.

Signed and Sealed this

Twenty-first Day of November, 1995

BRUCE LEHMAN

Attest:

Attesting Officer

Commissioner of Patents and Trademarks